(12) United States Patent
Kasuga et al.

(10) Patent No.: US 8,383,211 B2
(45) Date of Patent: Feb. 26, 2013

(54) METHOD OF FORMING THIN FILM (75) Inventors: Osamu Kasuga, Suwa (JP); Kei Hiruma, Chino (JP)

(73) Assignee: Seiko Epson Corporation, Tokyo (JP)

( * ) Notice: Subject to any disclaimer, the term of this patent is extended or adjusted under 35 U.S.C. 154(b) by 219 days.

(21) Appl. No.: 12/219,756

(22) Filed: Jul. 28, 2008

(65) Prior Publication Data

US 2009/0035526 A1 Feb. 5, 2009

Related U.S. Application Data (62) Division of application No. 11/116,267, filed on Apr. 28, 2005, now abandoned.

(30) Foreign Application Priority Data

Jul. 2, 2004 (JP) .................................. 2004-196764

(51) Int. Cl.
*G02F 1/1337* (2006.01)

(52) U.S. Cl. ........... 428/1.2; 428/1.5; 349/122; 349/123

(58) Field of Classification Search .................... 428/1.2, 428/1.5; 349/138, 153, 162, 122–123
See application file for complete search history.

(56) References Cited

U.S. PATENT DOCUMENTS

| | | | | |
|---|---|---|---|---|
| 4,113,492 A | * | 9/1978 | Sato et al. ................... | 430/271.1 |
| 5,194,976 A | * | 3/1993 | Nakano et al. ................ | 349/138 |
| 5,345,324 A | * | 9/1994 | Koseki et al. .................... | 349/44 |
| 5,365,357 A | * | 11/1994 | Ohgawara et al. ............ | 349/111 |
| 6,271,902 B1 | | 8/2001 | Ogura et al. | |
| 6,529,220 B1 | | 3/2003 | Matsumoto | |
| 6,774,974 B1 | * | 8/2004 | Matsuyama .................. | 349/155 |
| 7,102,723 B2 | * | 9/2006 | Byun et al. ..................... | 349/156 |
| 7,202,927 B2 | | 4/2007 | Murade | |
| 7,216,584 B2 | * | 5/2007 | Byun et al. ..................... | 101/170 |
| 2001/0005257 A1 | * | 6/2001 | Yamada et al. ............... | 349/158 |
| 2001/0006408 A1 | * | 7/2001 | Matsuyama et al. .......... | 349/143 |
| 2001/0033354 A1 | * | 10/2001 | Kodate et al. ................. | 349/139 |
| 2003/0016328 A1 | * | 1/2003 | Chung et al. ................. | 349/149 |
| 2003/0117569 A1 | * | 6/2003 | Kim et al. ..................... | 349/153 |
| 2003/0157244 A1 | * | 8/2003 | Kawase .......................... | 427/58 |
| 2003/0159651 A1 | | 8/2003 | Sakurada | |
| 2004/0079254 A1 | | 4/2004 | Hasei | |
| 2004/0131861 A1 | | 7/2004 | Chae et al. | |
| 2004/0239853 A1 | | 12/2004 | Sakurada | |

FOREIGN PATENT DOCUMENTS

| | | |
|---|---|---|
| CN | 1188898 A | 7/1998 |
| EP | 577399 A2 | 1/1994 |
| JP | A-8-15684 | 1/1996 |
| JP | A-09-127509 | 5/1997 |
| JP | A-11-090295 | 4/1999 |
| JP | A-11-239754 | 9/1999 |

(Continued)

OTHER PUBLICATIONS

JPO Website Machine English Translation of JP08-015684, Sakaishi Katsunobi, Jan. 19, 1996.*

(Continued)

*Primary Examiner* — Sophie Hon
(74) *Attorney, Agent, or Firm* — Oliff & Berridge, PLC (57) ABSTRACT

A method of forming a thin film includes: forming a thin film on a substrate by discharging liquid material as a droplet; discharging the liquid material to a liquid material disposing-region that is wider than a thin film forming region; and drying the liquid material thereby to dispose a raising portion at the edge of the thin film in the outside of the thin film forming region.

4 Claims, 11 Drawing Sheets

FOREIGN PATENT DOCUMENTS

| | | |
|---|---|---|
| JP | A-11-264968 | 9/1999 |
| JP | A-2001-071551 | 3/2001 |
| JP | A-2001-170546 | 6/2001 |
| JP | A-2001-183677 | 7/2001 |
| JP | A-2001-337316 | 12/2001 |
| JP | A 2002-221712 | 8/2002 |
| JP | A 2003-126760 | 5/2003 |
| JP | A-2003-195353 | 7/2003 |
| JP | A-2003-245582 | 9/2003 |
| JP | A-2003-273092 | 9/2003 |
| JP | A-2004-53758 | 2/2004 |
| JP | A-2004-055283 | 2/2004 |

OTHER PUBLICATIONS

Dec. 30, 2009 Office Action cited in U.S. Appl. No. 11/116,267.
Chinese Patent Office, Office Action issued on Feb. 14, 2012 in Chinese Patent Application No. 201010183382.8 w/English-language Translation.

* cited by examiner

METHOD OF FORMING THIN FILM

This is a Division of application Ser. No. 11/116,267 filed Apr. 28, 2005, now abandoned, which claims the benefit of Japanese Patent Applications No. 2004-196764 filed Jul. 2, 2004. The disclosures of the prior applications are hereby incorporated by reference herein in their entirety.

BACKGROUND OF THE INVENTION

1. Technical Field

The present invention relates to a method of forming a thin film.

2. Related Art

As the method of forming a thin film, a spin coating method, a flexographic printing method, or the like have been generally used. On the contrary, a method of forming a thin film using a droplet discharging method effective for the reduction of the amount of consumed ink and the reduction of the number of steps have been recently wide-spreading. In such a method of forming a thin film using the droplet discharging method, the thin film is formed by discharging a plurality of droplets, ink (a liquid material) being as the droplet, to dispose and by drying this disposed ink thereby to remove the solvent within the ink.

However, in the method of forming a thin film using such a droplet discharging method, at the time of drying the ink disposed by discharging a plurality of droplets, the drying rate differs between the ink at the edge of a thin film and the ink in the center portion of the thin film. More particularly, the ink at the edge of the thin film dries at a higher speed than the ink in the center portion of the thin film. For this reason, in the step of drying the ink, the solid portion within the ink will flow to the edge where the drying rate is high, and as a result the thin film the edge of which is raised will be formed.

Such a thin film the edge of which is raised does not have a uniform film thickness, and therefore does not have a uniform functionality over the entire surface. For this reason, for example, when forming, by the method of forming a thin film using the droplet discharging method, an orientation film and an overcoating film of a liquid crystal display device which requires especially the uniformity of the film thickness in order to attain a higher quality, a problem will occur that the film thicknesses of the orientation film and the overcoating material are not made uniform, and thus the desired functionalities of the orientation film and the overcoating material are not obtained.

In order to solve such a problem, it is conceivable that the raising portion at the thin film edge is suppressed by applying the technique described in Japanese Unexamined Patent Publication No. 2001-170546 and giving a temperature gradient to the substrate, thereby controlling the drying rate at the edge and in the center portion of the thin film to make the drying rate equal between at the edge and in the center portion of the thin film.

Japanese Unexamined Patent Publication No. 2001-170546 is an example of related art.

However, when forming a thin film with the film thickness of the order of Å like the orientation film, the ink will evaporate at the time of having given a temperature gradient to the substrate, and thus the ink will dry to solidify before a leveling effect of the ink occurs. Moreover, the substrate having a temperature gradient will make non-uniform the temperature distribution in the same film surface of the ink which is discharge-disposed in the substrate. Accordingly, when using a polymer ink or a pigment ink as the ink, the kinetic conditions of the particles within the ink will change, and thus irregularity in the film will likely occur after having dried the ink.

SUMMARY

An advantage of the invention is to make uniform the film thickness of the thin film in a predetermined thin film forming region for more certain and more easily.

According to an aspect of the invention, a method of forming a thin film includes: forming a thin film on a substrate by discharging a liquid material as a droplet; discharging a liquid material to a liquid material disposing-region that is wider than a thin film forming region; and drying the liquid material thereby to dispose a raising portion at the edge of the thin film in the outside of the thin film forming region.

According to the method of forming a thin film having such a characteristic of the invention, because the raising portion at the edge of the thin film is disposed outside the thin film forming region, the thin film with a uniform film thickness is formed in the thin film forming region. This enables the thin film to exhibit a desired functionality in the thin film forming region. Thus, according to the method of forming a thin film of the invention, the thin film with a uniform film thickness can be formed in the thin film forming region without giving a temperature gradient to the substrate, and it is therefore possible to make uniform the film thickness of the thin film in the thin film forming region for more certain and more easily.

According to another aspect of the invention, the method of forming a thin film includes: grasping a width of the raising portion at the edge of the thin film; and determining the liquid material disposing-region based on the width of the raising portion at the edge of the thin film. By employing such a configuration, the liquid material disposing-region is determined based on the width of the raising portion at the edge of the thin film that is grasped in advance. Accordingly, because the raising portion can be disposed in the outside of the thin film forming region for certain, the film thickness of the thin film in the thin film forming region can be made uniform for more certain.

In the method of forming a thin film of the invention, it is preferable to employ a configuration wherein when the substrate is a substrate for a liquid crystal display and the thin film is an orientation film, the raising portion at the edge of the thin film is disposed on top of a light-shielding film that covers the thin film forming region. By employing such a configuration, the orientation film with a uniform film thickness can be formed in the thin film forming region without providing another region for disposing the raising portion in the outside of the thin film forming region.

In the method of forming a thin film of the invention, it is further preferable to employ a configuration wherein the substrate is a substrate for a liquid crystal display, and the thin film is an overcoating film. By employing such a configuration, the overcoating film with a uniform film thickness can be formed in the thin film forming region.

In the method of forming a thin film of the invention, it is further preferable to employ a configuration wherein the thin film forming region is a display area. By employing such a configuration, the film thickness of the thin film formed in the display area will be made uniform. Accordingly, the thin film will exhibit the desired functionality in the entire display area, and it is therefore possible to further enhance the display performance in the display area.

BRIEF DESCRIPTION OF THE DRAWINGS

The invention will be described with reference to the accompanying drawings, wherein like numbers reference like elements, are wherein.

DESCRIPTION OF THE EMBODIMENTS

Hereinafter, with reference to the accompanying drawings, one embodiment of the method of forming a thin film concerning the invention will be described. Moreover, in the following drawings, in order to make each member and each layer to be recognizable sizes, the scales of each member and each layer are changed suitably.

Figure 1:
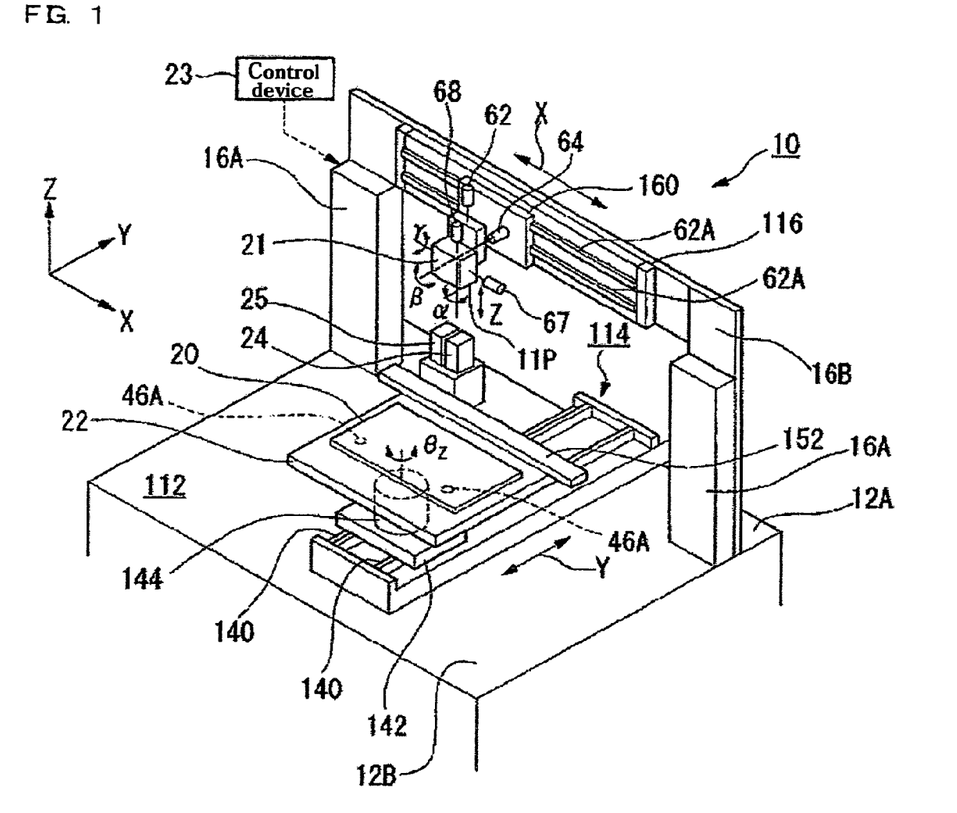
FIG. 1 is a perspective view showing a schematic structure of a thin film forming device 10 used for a method of forming a thin film of one embodiment of the invention.

FIG. 1 is a perspective view showing a schematic structure of the thin film forming device 10 used for the method of forming a thin film of this embodiment. In FIG. 1, the thin film forming device 10 is provided with a base 112, a substrate stage 22 provided on the base 112 and supporting a substrate 20, a first displacing device 114 interposed between the base 112 and the substrate stage 22 and movably supporting the substrate stage 22, a liquid discharging head 21 capable of discharging a liquid material to the substrate 20 supported by the substrate stage 22, a second displacing device 116 movably supporting the liquid discharging head 21, and a control device 23 for controlling the operation of discharging droplets of the liquid discharging head 21. Furthermore, the thin film forming device 10 has an electronic force balance (not shown) provided on the base 112 as a gravity measuring device, a capping unit 25, and a cleaning unit 24. Moreover, the operation of the thin film forming device 10 that includes the first displacing device 114 and the second displacing device 116 is controlled by the control device 23.

The first displacing device 114 is placed on the base 112, and is positioned along the Y direction. The second displacing device 116 is standingly fixed to the base 112 using supports 16A and 16A, and is fixed at the rear part 12A of the base 112. The X direction (a second direction) of the second displacing device 116 is the direction perpendicular to the Y direction (a first direction) of the first displacing device 114. Here, the Y direction is the direction along the direction from the front part 12B to the direction to the rear part 12A of the base 112.

On the contrary, the X direction is the direction along the longitudinal direction of the base 112, and both X and Y directions are horizontal, respectively. Moreover, the Z direction is the direction perpendicular to the X direction and the Y direction.

The first displacing device 114 is constituted, for example, of a linear motor and is provided with guide rails 140 and 140 and a slider 142 movably provided along this guide rail 140. The slider 142 of the first displacing device 114 of this linear-motor type can be positioned by moving to the Y direction along the guide rail 140.

Moreover, the slider 142 is provided with a motor 144 for the rotation around the Z-axis ($\theta_Z$). This motor 144 is, for example, a direct drive motor, and the rotor of the motor 144 is fixed to the substrate stage 22. Accordingly, by turning on electricity to the motor 144, the rotor and the substrate stage 22 rotate along the $\theta_Z$ direction thereby enabling the indexing (determining the rotation) of the substrate stage 22. Namely, the first displacing device 114 can move the substrate stage 22 to the Y direction (the first direction) and the $\theta_Z$ direction.

The substrate stage 22 holds the substrate 20 to position in a predetermined position. Moreover, the substrate stage 22 has an adsorb-holding device (not shown), and adsorbs and holds the substrate 20 onto the substrate stage 22 through a hole 46A of the substrate stage 22 by the operation of the adsorb-holding device.

The second displacing device 116 is constituted of a linear motor, and is provided with a column 16B fixed to the supports 16A and 16A, a guide rail 62A supported by this column 16B, and a slider 160 supported movably to the X direction along the guide rail 62A. The slider 160 can be positioned by moving to the X direction along the guide rail 62A, and the liquid discharging head 21 is fixed to the slider 160.

The liquid discharging head 21 has motors 62, 64, 67, and 68 as an oscillate-positioning device. If the motor 62 is actuated, the liquid discharging head 21 will move up and down along the Z-axis, thereby enabling the positioning. This Z-axis is the direction (the vertical direction) perpendicular to the X-axis and the Y-axis, respectively. If the motor 64 is actuated, the liquid discharging head 21 will oscillate along the β direction around the Y-axis, thereby enabling the positioning. If the motor 67 is actuated, the liquid discharging head 21 will oscillate along the γ direction around the X-axis, thereby enabling the positioning. If the motor 68 is actuated, the liquid discharging head 21 will oscillate along α direction around the Z-axis, thereby enabling the positioning. Namely, the second displacing device 116 supports this liquid discharging head 21 movably to the X direction (the first direction) and the Z direction, and at the same time supports this liquid discharging head 21 movably to the $\theta_X$ direction, the $\theta_Y$ direction, and the $\theta_Z$ direction.

Thus, in the slider 160, the liquid discharging head 21 of FIG. 1 can be positioned by moving linearly to the Z-axis direction, and can be positioned by oscillating along α, β and γ, and thus a droplet-discharging face 11P of the liquid discharging head 21 can precisely control the position or the orientation against the substrate 20 at the side of the substrate stage 22. Moreover, a plurality of nozzles to discharge the liquid material as the droplet are provided in the droplet-discharging face 11P of the liquid discharging head 21.

The liquid discharging head 21 discharges a liquid material from the nozzle by the so-called droplet discharging method. As the droplet discharging method, various well-known techniques, such as a piezo method of discharging ink using a piezo element as the piezoelectric element, a method of discharging a liquid material by means of bubbles generated by heating the liquid material can be applicable. Among these, the piezo method has an advantage of not giving influences to the composition of the material or the like because heat is not applied to the liquid material. Incidentally, the piezo method will be used in this example.

Figure 2:
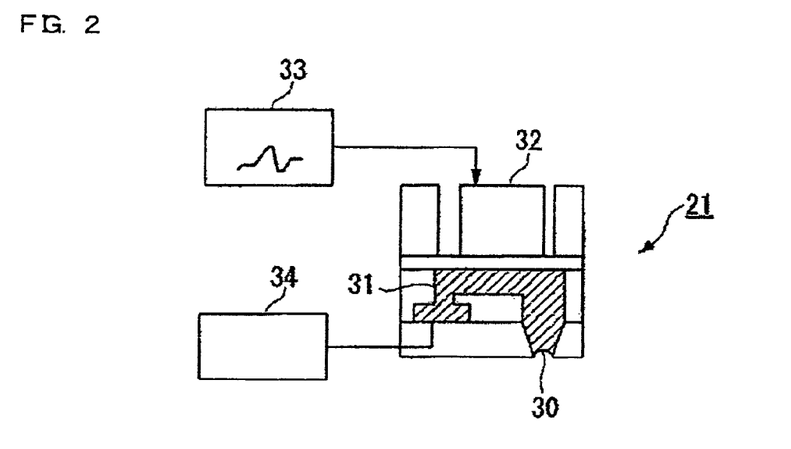
FIG. 2 is a view for explaining the principle of discharging a liquid material by a piezo method.

FIG. 2 is a view for explaining the principle of discharging a liquid material by the piezo method. In FIG. 2, a piezo element 32 is placed adjoining to a liquid room 31 containing the liquid material. The liquid material is supplied to the liquid room 31 via a liquid material supply system 34 including a material tank that accommodates the liquid material. The piezo element 32 is coupled to a driving circuit 33, and through this driving circuit 33 a voltage is applied to the piezo element 32. By deforming the piezo element 32, the liquid room 31 will deform, and thereby the liquid material is discharged from a nozzle 30. At this time, by changing the value of the applied voltage, the distortion amount of the piezo element 32 is controlled, and by changing the frequency of the applied voltage the strain rate of the piezo element 32 is controlled. Namely, in the liquid discharging head 21, the discharging of the liquid material from the nozzle 30 is controlled by controlling the applied voltage to the piezo element 32.

Back to FIG. 1, the electronic force balance (not shown), for example, receives droplets of 5,000 drops from the nozzle of the liquid discharging head 21 in order to measure and manage the weight of one drop of the droplet discharged from the nozzle of the liquid discharging head 21. The electronic force balance can measure the weight of one drop of droplet precisely by dividing the weight of the droplet of these 5,000 drops by the number of 5,000. Based on the measured quantity of this droplet, the amount of droplet to be discharged from the liquid discharging head 21 can be controlled optimally.

The cleaning unit 24 can carry out cleaning of the nozzle or the like of the liquid discharging head 21 periodically or as required during the device manufacturing step or during a standby time. The capping unit 25 puts a cap on this droplet-discharging face 11P during a standby time when the devices are not manufactured so that the droplet-discharging face 11P of the liquid discharging head 21 will not dry.

The displacement of the liquid discharging head 21 to the X direction by the second displacing device 116 allows the liquid discharging head 21 to be positioned selectively above the electronic force balance, the cleaning unit 24, or the capping unit 25. Namely, even in the course of the device manufacturing operation, the weight of the droplet can be measured if the liquid discharging head 21 is moved, for example, to the side of the electronic force balance. Moreover, if the liquid discharging head 21 is moved to above the cleaning unit 24, cleaning of the liquid discharging head 21 can be carried out. Moreover, if moving the liquid discharging head 21 to above the capping unit 25, a cap will be attached to the droplet-discharging face 11P of the liquid discharging head 21 thereby to prevent from drying.

Namely, these electronic force balance, cleaning unit 24, and the capping unit 25 are disposed directly under the displacing course of the liquid discharging head 21 at the back end side on the base 112, apart from the substrate stage 22. Because the material-supplying operation as well as the material-removing operation of the substrate 20 to the substrate stage 22 are carried out at the front end side of the base 112, there will be no inconveniences given to the above operations from the electronic force balance, the cleaning unit 24, or the capping unit 25.

As shown in FIG. 1, in the portions other than the portion for supporting the substrate 20 in the substrate stage 22, there is provided, apart from the cleaning unit 24, a preparatory discharging area 152 in which the liquid discharging head 21 carries out waste-discharging or trial-discharging of the droplet. This preparatory discharging area 152 is provided along the X direction of the back end portion side of the substrate stage 22, as shown in FIG. 1. This preparatory discharging area 152 is fastened to the substrate stage 22, and is constituted of a receiving member having a groove shaped cross-section that is opened upwards, and an absorber exchangeably disposed in the groove of the receiving member to absorb the discharged droplet.

Various kinds, such as a glass substrate, a silicon substrate, a quartz substrate, a ceramic substrate, a metal substrate, a plastic substrate, and a plastic film substrate can be used as the substrate 20. Moreover, the substrates wherein a semiconductor film, a metal film, a dielectric film, an organic film, or the like are formed as the base layer in the surface of the substrate made of these various kinds of raw material are also included. Moreover, for example, polyolefine, polyester, polyacrylate, polycarbonate, polyether sulphone, polyether ketone, or the like are used as the above-described plastic.

Figure 3A:
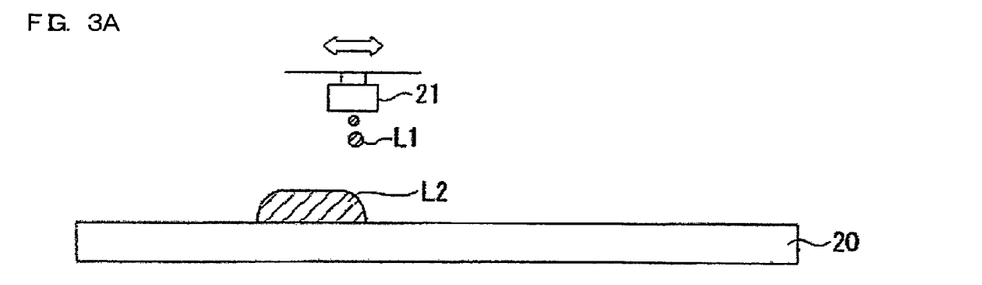
FIG. 3 shows explanatory views for explaining a method of forming a thin film of one embodiment of the invention.
Figure 3B:
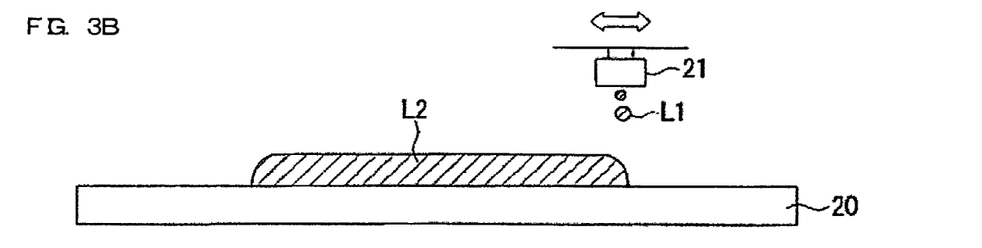
Figure 3C:
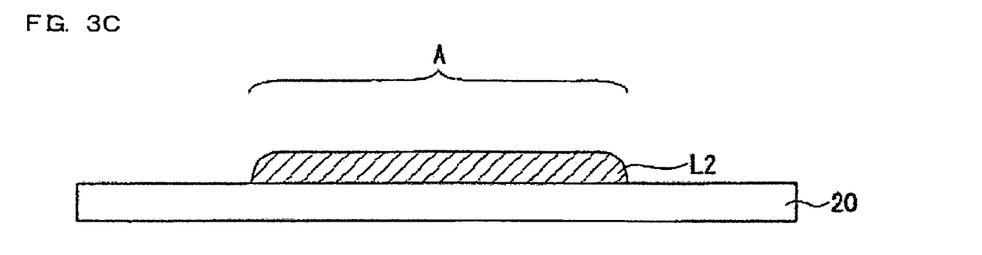

Then, the method of forming a thin film of this embodiment will be described with reference to FIG. 3 through FIG. 5. The method of forming a thin film of this embodiment includes a preparation step and a thin film forming step. Moreover, in the method of forming a thin film of this embodiment, the liquid material is discharge-disposed on the substrate 20 by the above-described thin film forming device 10. Hereinafter, details of each step will be described.

(Preparation Step)

The preparation step includes: forming a thin film under the same conditions as the case where a thin film is actually formed in the substrate 20, grasping the width (hereinafter, referred to as a raising width) of a raising portion at the edge of this thin film (a grasping step); and determining a disposing region (a liquid material disposing-region) in which the liquid material is to be disposed based on this grasped raising width (a liquid material disposing-region determining step). Moreover, in the method of forming a thin film of this embodiment, assume that an optimal drying condition corresponding to the liquid material to be discharge-disposed is already determined before this preparation step.

First, the surface of the substrate 20 is processed as to be lyophilic with the liquid material as required. The lyophilic treatment includes, for example, an atmospheric-pressure plasma method, a UV treating method, an organic thin film method (a decane film, a polyethylene film), or the like. In the plasma method, irradiating of oxygen in a state of plasma to the surface of a target body makes the surface thereof lyophilic or to be activated. Accordingly, the wettability of the surface of the substrate 20 will be improved (the contact angle of the surface of the substrate 20 of around 70° before the processing will be 20° or less, for example), thereby attaining improvement in the uniformity of the film thickness of the thin film.

Then, the liquid material as the droplet is caused to reach the target on the substrate 20 in a predetermined pitch, thereby to form a coating film on the substrate 20. Specifically, as shown in FIGS. 3A and B, a liquid material L1 as the droplet is discharged from the nozzle provided in the liquid discharging head 21, thereby causing this droplet to reach the target on the substrate 20 and to be disposed. Then, by repeating this droplet-discharging operation a liquid material film L2 is formed on the substrate 20. Moreover, in this preparation step, for example, as shown in FIG. 3C, the liquid material film L2 is formed in a thin film forming region A of the substrate 20.

Figure 3D:
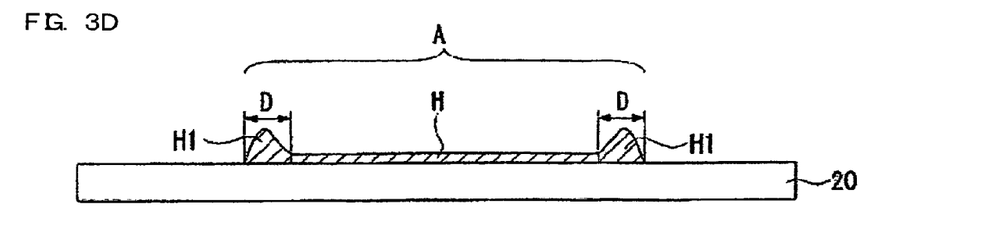
Figure 4:
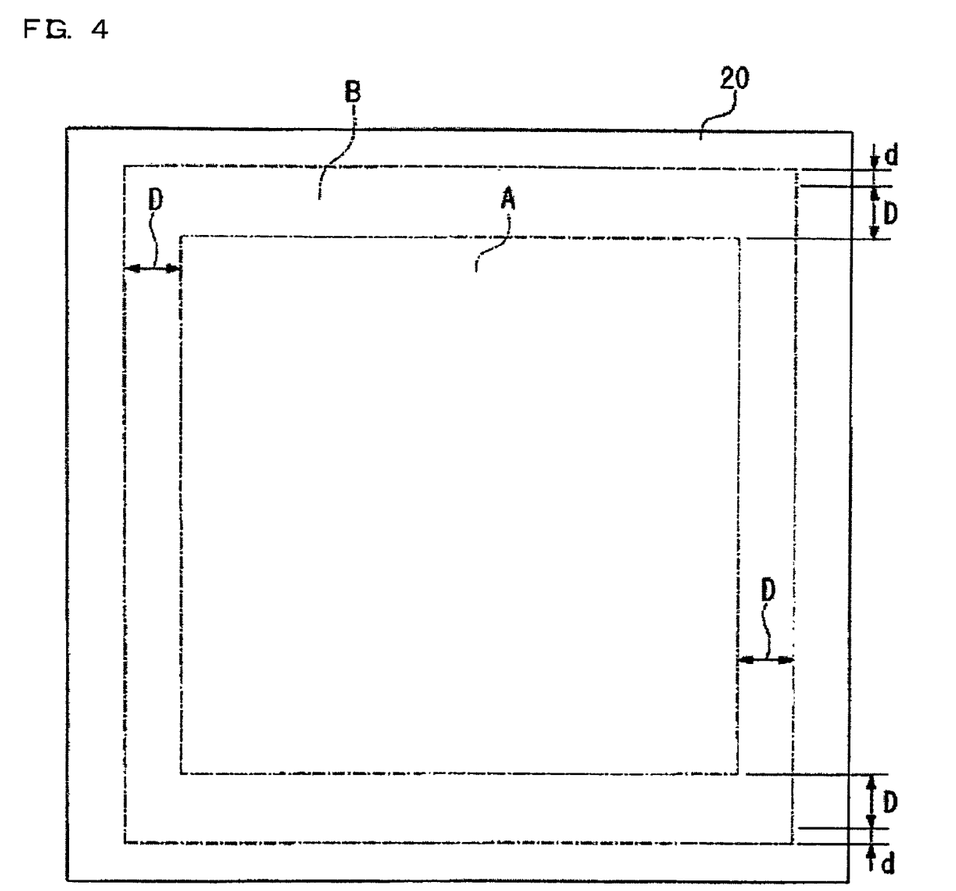
FIG. 4 is an explanatory view for explaining the method of forming a thin film of one embodiment of the invention.

Subsequently, by drying the liquid material film L2 disposed in the thin film forming region A of the substrate 20 under a predetermined drying condition, a thin film H is formed on the thin film forming region A, as shown in FIG. 3D. Here, as described in the Related Art, because the liquid material film L2 at the edge will dry more quickly than the one in the center portion in the course of drying, the solid content contained in the liquid material film L2 will flow towards the edge of the liquid material film L2, and as shown in FIG. 3D, the raising portion H1 is formed at the edge of the thin film H.

Then, the height of the thin film H is measured by means of a level difference measuring instrument or the like. Then, here, as shown in FIG. 3D, the height of the thin film H increases as going toward this edge. Then, the width from a place where the film thickness increases by 5% or more with respect to the center portion of the thin film H to the utmost place of the thin film H is grasped as a raising width D (the grasping step). Note that it is arbitrary to define, as the raising portion D, the place where the film thickness increases how many % or more with respect to the center portion of the thin film H, and it is more preferable to define as the raising width D the width from a place where the film thickness increases by 2% or more with respect to the center portion to the utmost place of the thin film H. Thus, defining, as the raising width D, the width from a place where the film thickness increases by 2% or more with respect to the center portion to the utmost place of the thin film H is namely equivalent to the fact that the in-plane variation of the thin film H excluding the raising portion is made to be within 2%.

Then, the disposing region is determined based on the raising width D that is grasped as described above (the liquid material disposing-region determining step). Specifically, a region vertically and longitudinally wider at least by an amount of the raising width D than the thin film forming region A is determined as the disposing region. In addition, the four corners of the liquid material film L2 actually have further quicker drying rate as compared with the other edges. For this reason, as shown in FIG. 4, it is preferable to define, as the disposing region B, a region wider in the scanning direction of the thin film forming device 10 by one dot width d than the region which is wider than the thin film forming region A by an amount of the raising width D.

Upon determination of the disposing region B in this way, this disposing region B will be memorized in the control device 23 of the thin film forming device 10. Then, the thin film forming step in which the thin film H is actually formed in the substrate 20 will be carried out subsequently. Note that, the value of the raising width D will alter depending on the liquid material composition and the drying conditions of the liquid material film L2. On the contrary, even if the disposing region of the liquid material film L2 is extended, this value will not alter. For this reason, in the case where the liquid material film L2 is disposed in the disposing region B wider than the thin film forming region A to dry this liquid material film L2 under the same drying conditions, the value of the raising width D will be the same as that of the case where the liquid material film L2 is disposed in the thin film forming region A.

(Thin Film Forming Step)

A thin film forming step is a step of actually forming the thin film H the film thickness of which is made uniform in the thin film forming region A on the substrate 20.

Figure 5A:
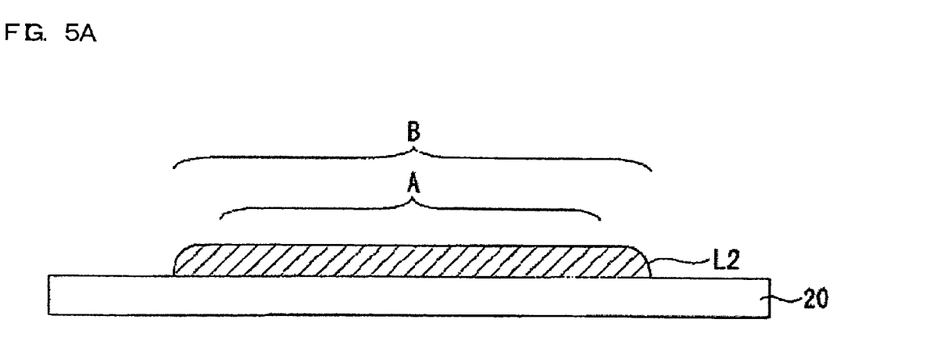
FIG. 5 is an explanatory view for explaining the method of forming a thin film of one embodiment of the invention.

Specifically, first, the surface of the substrate 20 is processed to be lyophilic with the liquid material as required like the above-described preparation step. Then, the liquid material L1 is discharge-disposed in the disposing region B (the region wider than the thin film forming region A), which is determined in the above-described preparation step using the thin film forming device 10, thereby forming the liquid material film L2 in the disposing region B as shown in FIG. 5A.

Figure 5B:
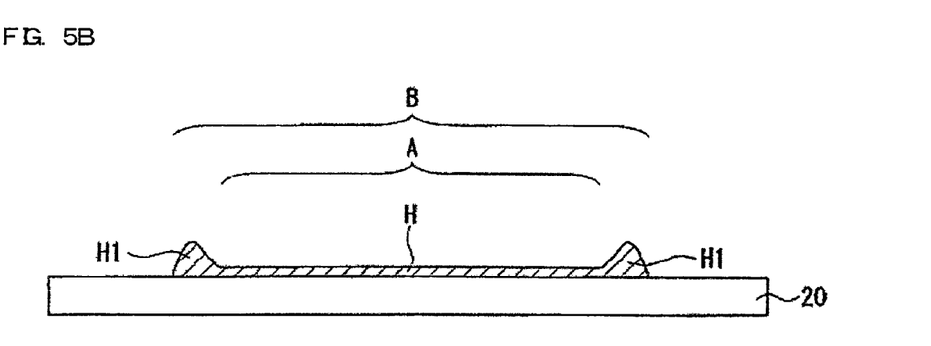

Then, by drying the liquid material film L2 disposed in the disposing region B under the same conditions as the above-described preparation step, the thin film H is formed on the substrate 20, as shown in FIG. 5B. Here, the disposing region B is vertically and longitudinally wider than the thin film forming region A at least by an amount of the raising width D. For this reason, as shown in FIG. 5B, a raising portion H1 at the edge of the thin film H will be disposed in the outside of the thin film forming region A. Because in the above-described preparation step the width from a place where the film thickness increases by 5% or more with respect to the center portion of the thin film H to the utmost place of the thin film H is defined as the raising width D, the thin film H of which in-plane variation is made 5% or less is formed in the thin film forming region A.

Thus, according to the method of forming a thin film of this embodiment, because the raising portion H1 at the edge of the thin film H is disposed in the outside of the thin film forming region A, the thin film H having a uniform film thickness is formed in the thin film forming region A. For this reason, it is possible to cause the thin film H to exhibit a desired functionality in the thin film forming region A. Accordingly, according to the method of forming a thin film of this embodiment, the thin film H with a uniform film thickness can be formed in the thin film forming region A without giving a temperature gradient to the substrate 20, and it is therefore possible to make uniform the film thickness of the thin film H in the thin film forming region A for more certain and more easily.

Then, a method of manufacturing a liquid crystal display device using the method of forming a thin film of this embodiment will be described with reference to FIG. 6 through FIG. 8.

Figure 6:
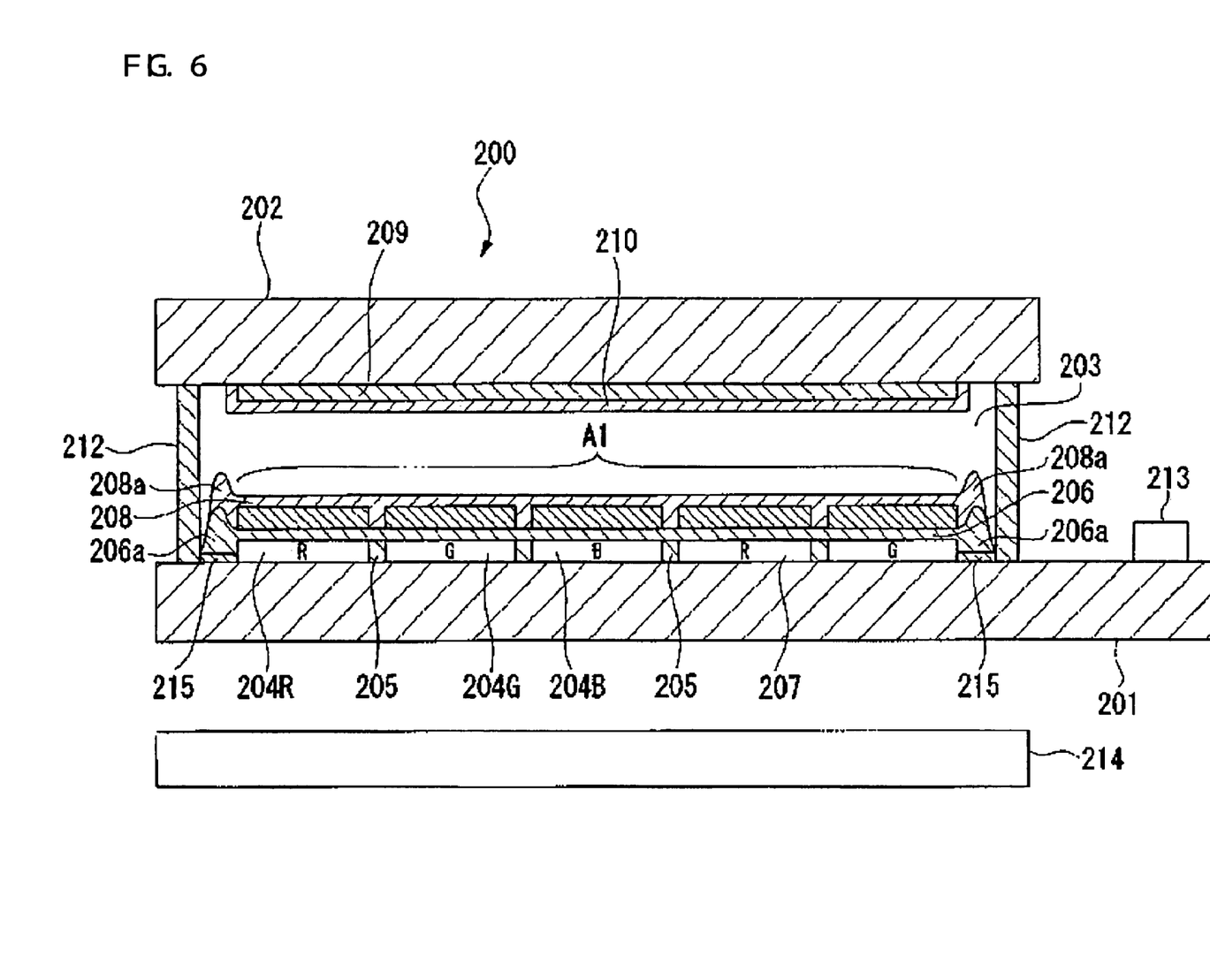
FIG. 6 typically shows an example of the cross-sectional structure of a liquid crystal display device of a passive matrix type.

FIG. 6 typically shows a cross-sectional structure of a liquid crystal display device of a passive matrix type. A liquid crystal display device 200 is of a transmission type, and consists of a structure where a liquid crystal layer 203 made of an STN (Super Twisted Nematic) liquid crystal or the like is interposed between a pair of glass substrates 201 and 202. The liquid crystal display device 200 is further provided with a driver IC 213 for supplying a driving signal to a liquid crystal layer, and a backlight 214 to serve as a light source.

In the glass substrate 201, a color filter 204 is disposed corresponding to the display area thereof. The color filter 204 is constituted regularly disposing pigmented layers 204R, 204G, and 204B consisting of each color of red (R), green (G), and blue (B). In addition, between these pigmented layers 204R (204G, 204B), a partition 205 consisting of a black matrix, a bank, or the like is formed. Moreover, on top of the color filter 204 and the partition 205, there is provided an overcoating film 206 for eliminating the level differences formed by the color filter 204 and the partition 205, thereby planarizing them.

On top of the overcoating film 206, a plurality of electrodes 207 are formed in a striped shape, and further on top of them an orientation film 208 is formed. In the other glass substrate 202, a plurality of electrodes 209 are formed in a striped shape in the inner face as to be perpendicular to the electrodes on the side of the above-described color filter 204, and on these electrodes 209 an orientation film 210 is formed. Note that the respective pigmented layers 204R, 204G, and 204B of the above-described color filter 204 are disposed at the position corresponding to the intersecting position between the electrode 209 of the glass substrate 202 and the electrode 207 of the glass substrate 201, respectively. Moreover, the electrodes 207 and 209 are formed of a transparent conductive material, such as ITO (Indium Tin Oxide). A deflecting plate (not shown) is provided on the outer face sides of the glass substrate 202 and the color filter 204, respectively. In between the glass substrates 201 and 202, there are disposed a spacer (not shown) for keeping the gap (a cell gap) between these substrates 201 and 202 constant, and a sealant 212 for isolating a liquid crystal 203 from the open air. As the sealant 212, a thermosetting type or a photo-setting type resin is used, for example.

Moreover, on the substrate 201, a light-shielding film 215 is formed as to enclose a display area A1. This light-shielding film 215 can be formed of, for example, chromium or the like. Then, a raising portion 206a at the edge of the overcoating film 206, and raising portions 208a and 210a at the edges of the orientation films 208 and 210 are disposed on the light-shielding film 215.

In this liquid crystal display device 200, the above-described overcoating film 206 and orientation films 208 and 210 are formed using the method of forming a thin film described above. For this reason, in this liquid crystal display device 200, the film thicknesses of the orientation films 208 and 210 and the overcoating film 206 are made uniform in the display area, and it is therefore possible to further enhance the display performance in the liquid crystal display device 200. Moreover, in this liquid crystal display device 200, because the raising portion 206a at the edge of the overcoating film 206 and the raising portions 208a and 210a at the edges of the orientation film 208 and 210 are disposed on the light-shielding film 215, it is possible to make uniform the film thickness of the orientation films 208 and 210 and the overcoating film 206 in the display area A1 without additionally providing regions for disposing these raising portions 206a, 208a, and 210a.

Figure 7A:
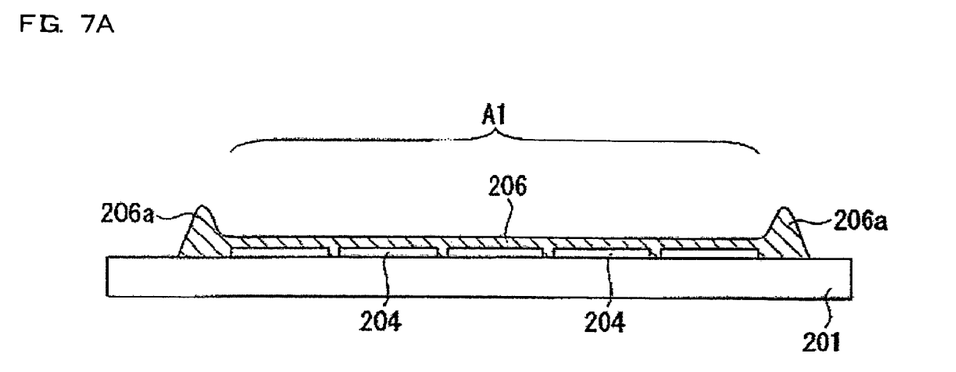
FIG. 7 is an explanatory view for explaining a method of manufacturing the liquid crystal display device of a passive matrix type.

FIG. 7 and FIG. 8 are views typically showing the method of manufacturing the liquid crystal display device 200. First, as shown in FIG. 7A, the overcoating film 206 is formed using the droplet discharging method on the substrate 201 in which the color filter 204 and the light-shielding film 215 are formed. In this case, the overcoating film 206 is formed so that the raising portion 206a at the edge of the overcoating film 206 may be disposed in the outside of the display area A1 using the method of forming a thin film of this embodiment described above. By forming the overcoating film 206 in this way, the film thickness of the overcoating film 206 in the display area A1 is made uniform thereby to improve the flatness in the display area A1.

Figure 7B:
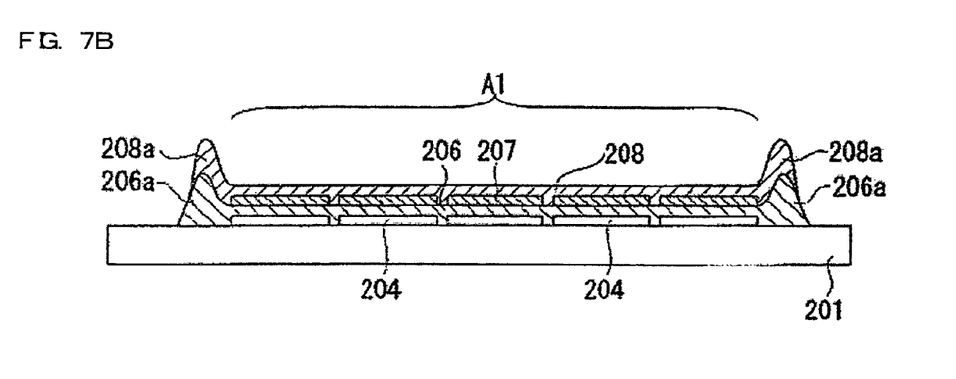

Subsequently, after forming the electrode 207 on the overcoating film 206 in the display area A1, the orientation film 208 is formed in the display area A1 using the droplet discharging method, as shown in FIG. 7B. In this case, the orientation film 208 is formed so that the raising portion 208a at the edge of the orientation film 208 may be disposed in the outside of the display area A1 using the method of forming a thin film of this above-described embodiment. Thus, by forming the orientation film 208 in this way, the film thickness of the orientation film 208 in the display area A1 is made uniform thereby to improve the visibility in the display area A1.

Figure 7C:
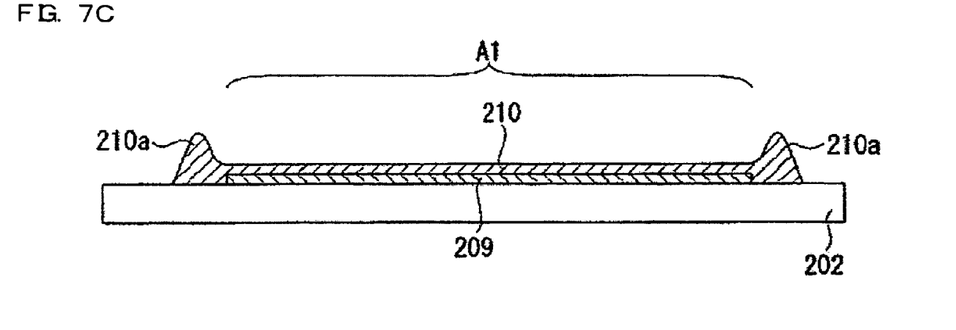

Then, as shown in FIG. 7C, the orientation film 210 is formed using the droplet discharging method in the region corresponding to the display area A1 on the substrate 202 in which the electrode 209 is formed. In this case, the orientation film 210 is formed so that the raising portion 210a at the edge of the orientation film 210 may be disposed in the outside of the display area A1 using the method of forming a thin film of the above-described embodiment. By forming the orientation film 210 in this way, the film thickness of the orientation film 210 in the display area A1 is made uniform thereby to improve the visibility in the display area A1.

Figure 8A:
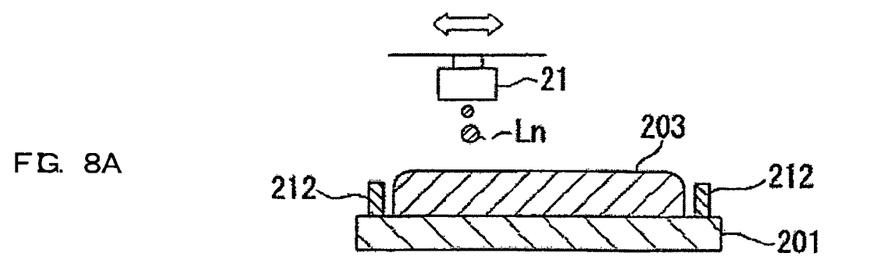
FIG. 8 is an explanatory view for explaining the method of manufacturing the liquid crystal display device of a passive matrix type.

Then, after disposing the sealant 212 on the substrate 201, the liquid crystal layer 203 is interposed in between the substrates 201 and 202. Specifically, as shown in FIG. 8A, a prescribed quantity of liquid crystal is disposed quantitatively onto the glass substrate 201, for example, using the droplet discharging method. In addition, the prescribed quantity of liquid crystal to be disposed onto the glass substrate 201 is nearly equal to the capacity of the space formed between the glass substrates after having sealed. Note that in FIG. 8, the illustration of the color filter, the orientation film, the overcoating film, and the like are omitted.

Figure 8B:
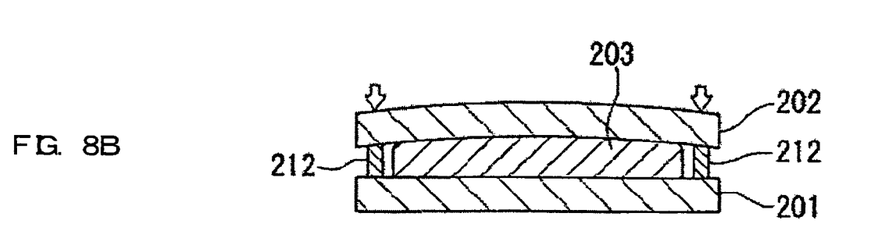
Figure 8C:
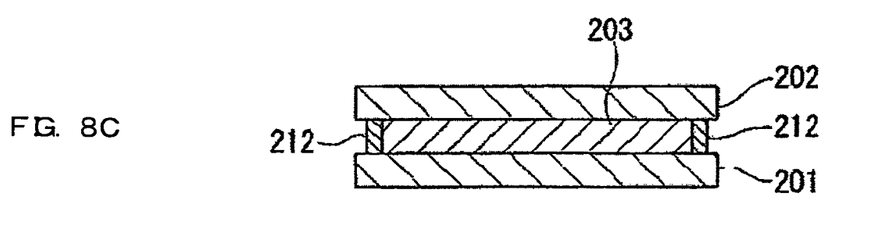

Then, as shown in FIGS. 8B and C, onto the glass substrate 201 in which the prescribed quantity of liquid crystal 203 is disposed, the other glass substrate 202 is bonded via the sealant 212 under a reduced pressure. Specifically, first, as shown in FIG. 8B, a pressure is applied primarily to the edges of the glass substrates 201 and 202, in which the sealant 212 is disposed, thereby adhering the sealant 212 to the glass substrates 201 and 202. Then, after the sealant 212 is dried to some extent in a prescribed passage of time, a pressure is applied to the entire outer faces of the glass substrates 201 and 202, thereby causing the liquid crystal 203 to spread into the entire space sandwiched by the both substrates 201 and 202. In this case, because the sealant 212 is already dried to some extent when the liquid crystal 203 is in contact with the sealant 212, there will be little performance deterioration of the sealant 212 and little degradation of the liquid crystal 203 involved in contacting with the liquid crystal 203.

After bonding the glass substrates 201 and 202 together, heat and light are applied to the sealant 212 to cure the sealant 212, thereby sealing the liquid crystal in between the glass substrates 201 and 202, as shown in FIG. 8C. Thus, by going through the above steps, the liquid crystal display device 200 shown in FIG. 6 is manufactured.

In addition, although the liquid crystal display device of a passive matrix type is shown in FIG. 6, the invention can be also applicable to a liquid crystal display device of an active matrix type using TFDs (Thin Film Diodes) or TFTs (Thin Film Transistors) as the switching elements.

FIG. 9 shows an example of the liquid crystal display device of an active matrix type using TFTs as the switching element, and FIG. A is a perspective view showing the entire structure of the liquid crystal display device of this example, and FIG. B is an enlarged view of one pixel in FIG. A.

In a liquid crystal display device 580 shown in FIG. 9, an element substrate 574 on the side in which the TFT elements are formed, and the counter substrate 575 are disposed facing to each other, and in between these substrates a sealant 573 is disposed in a frame shape, and a liquid crystal layer (illustration is omitted) is sealed in the region enclosed by the sealant 573 in between the substrates.

Figures 9A, 9B:
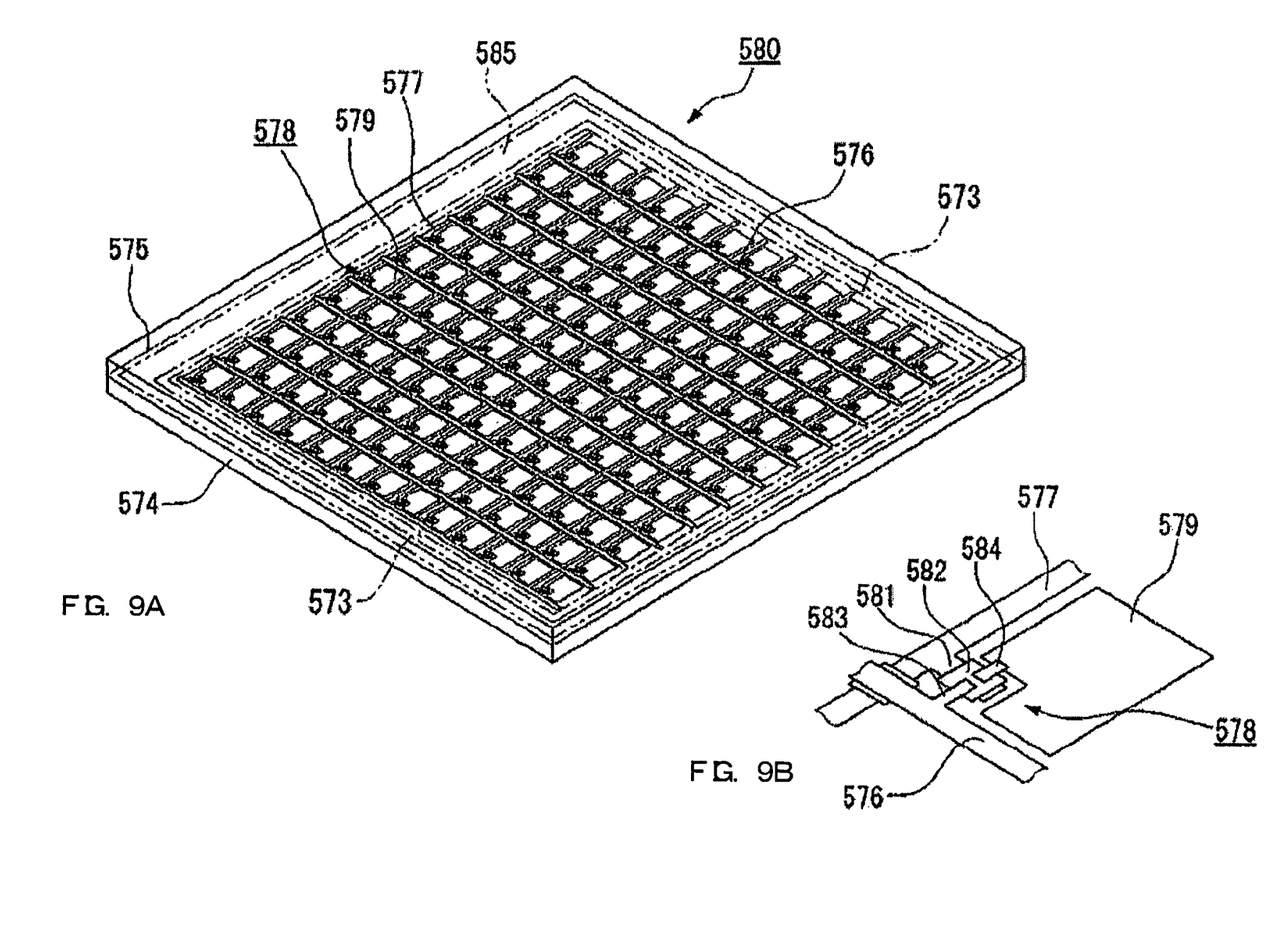
FIG. 9 is a view showing an example of a liquid crystal display device of an active matrix type which uses TFTs for switching elements.
Figure 10:
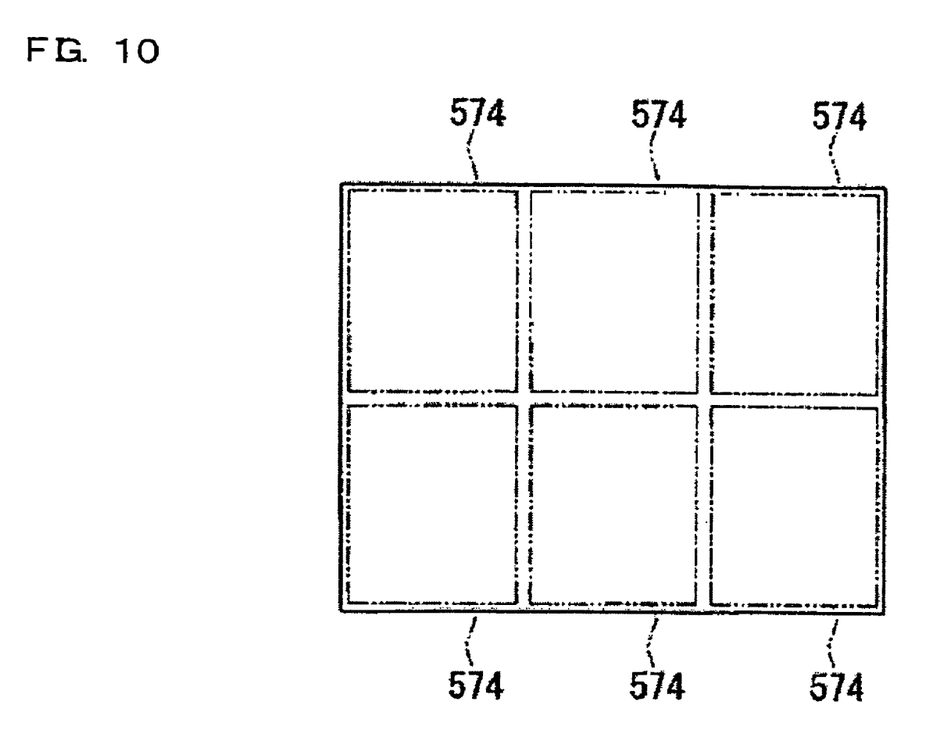
FIG. 10 is an illustrative view showing an example of the so-called multi-taking for fabricating substrates for a liquid crystal display device using a large-sized substrate.

Here, FIG. 10 is an illustrative view showing an example of the so-called multi-taking wherein the above-described element substrates and the counter substrates for liquid crystal display devices are fabricated using a large-sized substrate (for example, 1500 mm×1800 mm). In the example of FIG. 10, a plurality of (6 pieces in this example) substrates (element substrates 574, for example) are fabricated from one large-sized substrate, and in each of the element substrates 574 the TFT elements are formed respectively as shown in FIG. 9. In addition, with respect to the counter substrates 575 shown in FIG. 9, it is also possible to form a plurality of pieces from one large-sized substrate in the same way.

Back to FIG. 9, on the surface at the liquid crystal side of the element substrate 574, a number of source lines 576 and a number of gate lines 577 are provided in a lattice shape so as to intersect to each other. In the vicinity of the intersection of each source line 576 and each gate line 577, a TFT element 578 is formed, and via each TFT element 578 a pixel electrode 579 is coupled, and a number of pixel electrodes 579 are disposed in a matrix shape as viewed from the plane. On the other hand, on the surface at the liquid crystal layer side of the counter substrate 575, a common electrode 585 made of a transparent conductive material that is composed of ITO or the like is formed corresponding to the display area.

The TFT element 578 includes, as shown in FIG. 9B, a gate electrode 581 extending from the gate line 577, an insulating film (illustration is omitted) covering the gate electrode 581, a semiconductor layer 582 formed on the insulating film, a source electrode 583 extending from the source line 576 coupled to the source region in the semiconductor layer 582, and a drain electrode 584 coupled to a drain region in the semiconductor layer 582. Then, the drain electrode 584 of the TFT element 578 is coupled to the pixel electrode 579.

Figure 11:
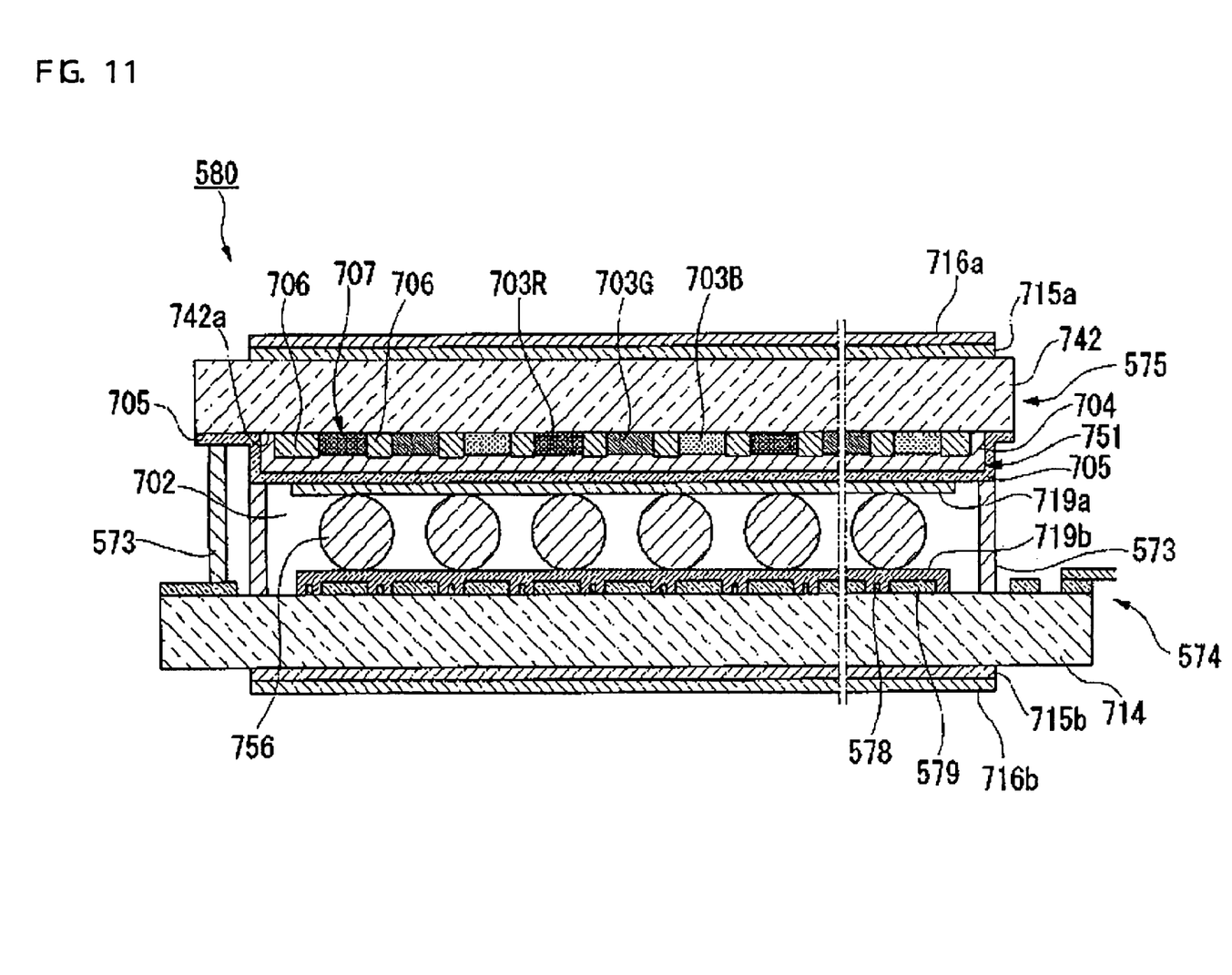
FIG. 11 is a cross-sectional structure view of the liquid crystal display device of an active matrix type.

FIG. 11 is a cross-sectional structure view of a liquid crystal display device of an active-matrix shape. The liquid crystal display device 580 is primarily constituted of a liquid crystal panel including the element substrate 574 and the counter substrate 575 disposed as to face to each other, a liquid crystal layer 702 sandwiched therebetween, a phase difference plate 715a attached to the counter substrate 575, a deflection plate 716a, a phase difference plate 715b attached to the element substrate 574, and a deflection plate 716b. The liquid crystal display device as a final product is constituted mounting supplementary elements such as a driver chip for driving the liquid crystal, wirings for transmitting electrical signals, and supporting medium or the like onto this liquid crystal panel.

The counter substrate 575 is constituted primarily of a light-transmissive substrate 742, and a color filter 751 formed in this substrate 742. The color filter 751 is constituted including a partition 706, pigmented layers 703R, 703G, and 703B as filter elements, and a protective film 704 covering the partition 706 and the pigmented layers 703R, 703B, and 703G.

The partition 706 is the one of a lattice-shape formed so as to encompass a filter element forming region 707 which is a pigmented layer forming region for forming each of the pigmented layers 703R, 703G, and 703B, respectively, and is formed in one face 742a of the substrate 742.

Moreover, the partition 706 is made of, for example, a black photosensitive resin film, and as this black photosensitive resin film, for example, the ones containing at least a photosensitive resin of a positive type or a negative type used for the regular photoresist and a black inorganic pigment such as carbon black or a black organic pigment are used. This partition 706 is formed of the ones containing a black inorganic pigment or a black organic pigment, and is formed in portions excluding the forming positions for the pigmented layers 703R, 703G, and 703B, and it is therefore possible to block off light transmission between the pigmented layers 703R, 703G and 703B. Therefore this partition 706 has a function also as a light-shielding film.

The pigmented layers 703R, 703G, and 703B are formed by discharging each of the filter element materials of red (R), green (G), and blue (B) to the filter element forming region 707 that is provided across the inner walls of the partition 706 and the substrate 742 using the droplet discharging method, and by drying thereafter.

Moreover, an electrode layer 705 made of a transparent conductive material such as ITO (Indium Tin Oxide) for driving the liquid crystal is formed roughly over the entire surface of the protective film 704. Furthermore, an orientation-film 719a is provided so as to cover this electrode layer 705 for driving the liquid crystal, and the orientation-film 719b is provided also on the pixel electrode 579 at the side of the element substrate 574.

The element substrate 574 is constituted such that an insulating layer (illustration is omitted) is formed on the light-transmissive substrate 714, and furthermore, on top of this insulating layer the TFT element 578 and the pixel electrode 579 are formed. Moreover, on the insulating layer formed on the substrate 714, as shown in FIG. 9, a plurality of scanning lines and a plurality of signal lines are formed in a matrix form, and the aforementioned pixel electrode 579 is provided for each region surrounded by these scanning lines and signal lines, and thus the TFT element 578 is incorporated in the position to which each pixel electrode 579, the scanning line, and the signal line are electrically coupled, whereby the electrical-conduction control for the pixel electrode 579 is carried out turning on and off the TFT element 578 by an application of signals to the scanning line and the signal line. Moreover, the electrode layer 705 formed on the counter substrate 575 side is made to be an entire surface electrode covering the entire pixel region in this embodiment. In addition, various kinds can be applicable to the wiring circuit of the TFTs and to the shape of the pixel electrodes.

The element substrate 574 and the counter substrate 575 are bonded together via a prescribed gap using the sealant 573 formed along the outer periphery edge of the counter substrate 575. In addition, a numeral 756 denotes a spacer for keeping the gap (a cell gap) in between the both substrates constant within the surface of the substrate. Between the element substrate 574 and the counter substrate 575, the liquid crystal sealing region of a rectangular shape is divide-formed by the sealant 573 of a frame shape as viewed from the plane, and inside this liquid crystal sealing region the liquid crystal is sealed.

Also in the liquid crystal display device 580 having such a structure, it is possible to improve the display performance of the liquid crystal display device 580 by forming the orientation films 719a and 719b using the method of forming a thin film of this embodiment.

Figure 12A:
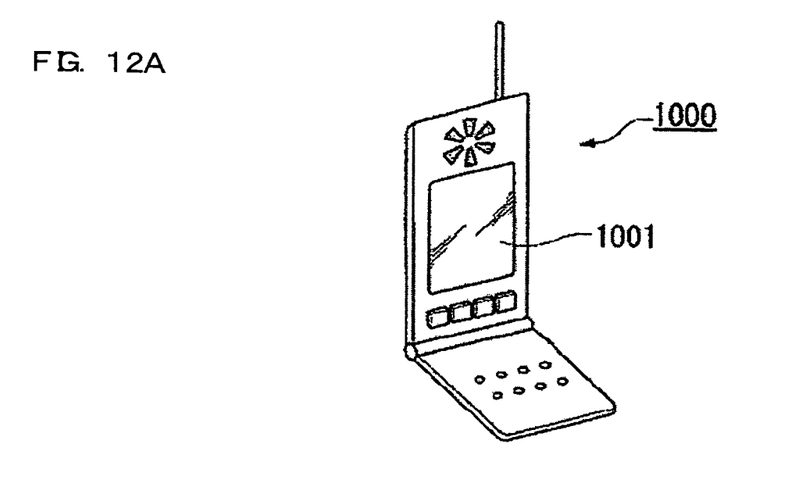
FIG. 12 shows examples of electronic apparatus having a liquid crystal display device.
Figure 12B:
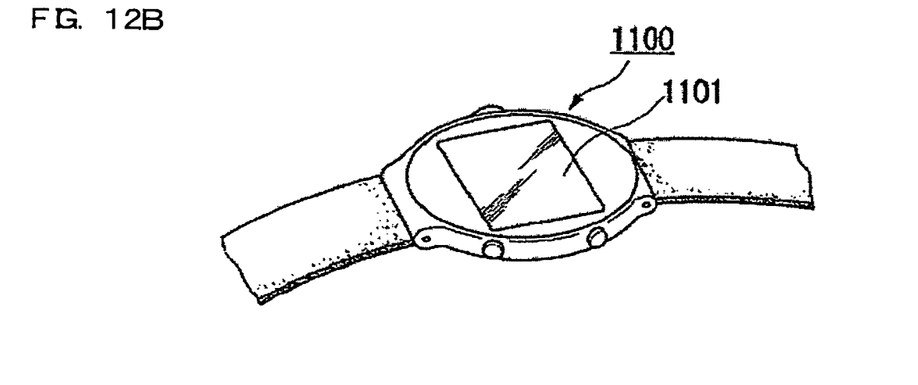
Figure 12C:
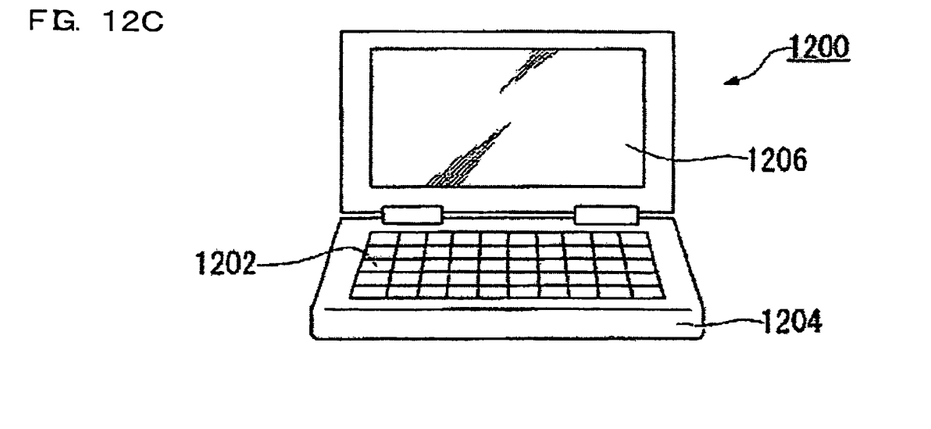

FIG. 12A through C shows examples of electronic apparatus having the above-described liquid crystal display device. The electronic apparatus of these examples are provided with the liquid crystal display device of the embodiment of the invention as the display means. FIG. 12A is a perspective view showing an example of a cellular phone. In FIG. 12A, a numeral 1000 denotes a cellular phone body, and a numeral 1001 denotes a display portion using the above-described liquid crystal display device. FIG. 12B is a perspective view showing an example of a wrist watch type electronic apparatus. In FIG. 12B, a numeral 1100 denotes a watch body and a numeral 1101 denotes a display portion using the above-described liquid crystal display device. FIG. 12C is a perspective view showing an example of a portable type information processing apparatus such as a word processor and a personal computer. In FIG. 12C, a numeral 1200 denotes an information processing device, a numeral 1202 denotes an input portion such as a keyboard, a numeral 1204 denotes an information processing device body, and a numeral 1206 denotes a display portion using the liquid crystal display device described above. Each of the electronic apparatus shown in FIG. 12A through C is provided with the liquid crystal display device as the display means manufactured by using the method of forming a thin film of this embodiment, and is therefore considered as the electronic apparatus having the display means of an excellent display characteristic.

Up to this moment, while the suitable embodiments of the method of forming a thin film concerning the embodiment of the invention have been described with reference to the accompanying drawings, the embodiments of the invention are not limited to such examples, not to mention. Various forms and combinations, and the like of each of the constituent members shown in the above-described examples are just examples, and can be modified variously based on the design requirement or the like, without departing from the spirit and scope of the embodiments of the invention.

For example, if there is no region that is wider than the width of the raising portion at the edge of the thin film in the outside of the thin film forming region, it is preferable to carry out the step of determining the composition and the drying conditions of the liquid material so that the width of the raising portion may go into the outside region of the thin film forming region by changing the compositions and the drying conditions of the liquid material and controlling the width of the raising portion.

Moreover, as shown in a FIG. 10, when fabricating a plurality of substrates from a large-sized substrate, the thin film forming may be carried out to the large-sized substrate as one substrate using the method of forming a thin film of the invention, or the thin film may be formed using the method of forming a thin film of the embodiment of the invention to the individual substrate fabricated from the large-sized substrate.

Moreover, in the above-described embodiments, the orientation film and the overcoating film are formed using the method of forming a thin film of the embodiment of the invention. However, the embodiment of the invention is not limited to these, and various thin films, such as photoresist can be formed using the method of forming a thin film of the invention.

Moreover, the raising portion at the edge of the thin film can be used as a spacer as described above, or can be also utilized as a bank at the time of finely adjusting the thickness of the thin film. Specifically, when the raising portion is utilized as the bank, the liquid material is discharge-disposed to the center portion of the thin film surrounded by this raising portion to dry this liquid material, and thereby the film thickness of the thin film can be gained further.

What is claimed is:

1. A liquid crystal display device having a rectangular display area, comprising:
   a pair of substrates;
   a liquid crystal layer disposed between the pair of substrates;
   an orientation film formed between the pair of substrates, and having a raising portion that is thicker than a center portion of the orientation film, the raising portion being edges of the orientation film and surrounding the entire display area, the entire raising portion being outside of the display area;
   a disposing region of the orientation film being a region vertically and longitudinally wider at least by an amount of a raising width than the display area, the raising width being a width from a place where the film thickness increases by 5% or more with respect to the center portion of the orientation film to an utmost place of the orientation film;
   an overcoating film formed between one of the pair of substrates and the orientation film, and having a raising portion disposed directly beneath the raising portion of the orientation film, and
   a light shielding film formed around the display area, wherein the light shielding film is disposed so as to overlap the raising portion at the edge of the orientation film.

2. The liquid crystal display device according to claim 1, wherein the orientation film is formed by discharging liquid material.

3. An electronic equipment that has a liquid crystal display device according to claim 1.

4. The liquid crystal display device according to claim 1,
   a portion of the orientation film other than the raising portion having a rectangular shape in perspective view.

\* \* \* \* \*